US011305193B2

(12) United States Patent
Sefcik et al.

(10) Patent No.: US 11,305,193 B2
(45) Date of Patent: Apr. 19, 2022

(54) SYSTEMS AND METHODS FOR MULTI-USER EDITING OF VIRTUAL CONTENT

(71) Applicant: Electronic Arts Inc., Redwood City, CA (US)

(72) Inventors: Bryan Scott Sefcik, Langley (CA); Matthew Jeremy Doell, Pitt Meadows (CA)

(73) Assignee: Electronic Arts Inc., Redwood City, CA (US)

( * ) Notice: Subject to any disclaimer, the term of this patent is extended or adjusted under 35 U.S.C. 154(b) by 64 days.

(21) Appl. No.: 16/997,629

(22) Filed: Aug. 19, 2020

(65) Prior Publication Data

US 2020/0391114 A1 Dec. 17, 2020

Related U.S. Application Data

(63) Continuation of application No. 16/179,703, filed on Nov. 2, 2018, now Pat. No. 10,758,826.

(51) Int. Cl.
*A63F 13/60* (2014.01)
*G06T 19/20* (2011.01)
*H04L 67/131* (2022.01)

(52) U.S. Cl.
CPC .............. *A63F 13/60* (2014.09); *G06T 19/20* (2013.01); *H04L 67/38* (2013.01); *A63F 2300/8082* (2013.01)

(58) Field of Classification Search
CPC .. A63F 13/20; A63F 13/30–33; A63F 13/332; A63F 13/335; A63F 13/35; A63F 13/60; A63F 13/70; A63F 13/73; A63F 13/77; A63F 2300/60; A63F 2300/209; A63F 2300/6009
See application file for complete search history.

(56) References Cited

U.S. PATENT DOCUMENTS

| | | |
|---|---|---|
| 2006/0223600 A1 | 10/2006 | Wisdom et al. |
| 2015/0314196 A1 | 11/2015 | Chapman et al. |
| 2018/0253296 A1 | 9/2018 | Brebner et al. |
| 2020/0139248 A1 | 5/2020 | Sefcik et al. |

*Primary Examiner* — Omkar A Deodhar
(74) *Attorney, Agent, or Firm* — Knobbe, Martens, Olson & Bear LLP

(57) ABSTRACT

Embodiments of the systems and methods described herein provide an editor hub that can host a virtual environment and allow multiple game developer systems to connect to. The editor hub can manage all change requests by connected game developers and execute the change requests into the runtime version of the data. The connected game developers can receive the same cached build results from the build pipeline, which can allow for simultaneous updates for a plurality of game developers working together on the same virtual content.

20 Claims, 11 Drawing Sheets

SYSTEMS AND METHODS FOR MULTI-USER EDITING OF VIRTUAL CONTENT

RELATED APPLICATIONS

This application is a continuation of application Ser. No. 16/179,703 filed Nov. 2 2018, the disclosure of which is hereby incorporated by reference herein in its entirety.

BACKGROUND

Virtual reality game development offers many opportunities, such as allowing developers to model three-dimensional virtual objects, such as buildings, aircrafts, boats, or homes. A game developer can start a virtual reality project by selecting a development platform, creating virtual content, and saving the virtual content for the next game developer. Then, another game developer can load the saved virtual content and make further edits. Developer tasks are performed individually, without much collaboration. Accordingly, this serial process of virtual reality game development is prone to delays as one developer needs to wait until the other developer completes his or her work.

SUMMARY OF CERTAIN EMBODIMENTS

The systems, methods, and devices of this disclosure each have several innovative aspects, no single one of which is solely responsible for the all of the desirable attributes disclosed herein.

One embodiment discloses a method for editing immutable game data of a game application within a virtual development space, wherein the method includes: creating virtual development space, wherein the virtual development space enables a plurality of game developer systems to edit immutable game data associated with virtual objects of the game application, wherein the virtual development space includes a three-dimensional simulated space instanced on a computer server that is accessible by a plurality of game developers systems and that are located remotely from the computer server to edit immutable game data, wherein the immutable game data includes at least a first virtual object; connecting a first game developer system to the virtual development space; connecting a second game developer system to the virtual development space; receiving a first command from the first game developer system to edit the first virtual object in the virtual development space; initiating a change to the first virtual object in the immutable game data corresponding to the first command to generate an updated first virtual object; and transmitting the updated first virtual object to the second game developer system.

In some embodiments, the method can further comprise generating a playable instance of a game by based on the immutable game data, wherein the immutable game data includes the updated first virtual object, wherein the immutable game data is not changable by players of the playable instance of the game.

In some embodiments, connecting the first game developer system includes generating a first avatar associated with the first game developer system, and transmitting a location of the first avatar to the first and second game developer systems to display the first avatar at the location.

In some embodiments, the method can further comprise receiving a request to move the first avatar from the location to a new location; and transmitting the new location of the first avatar to the second game developer system to display the first avatar in the new location on the second game developer system.

In some embodiments, the method can further comprise receiving from the first game developer system a first selection of the first virtual object in the virtual development space; and transmitting an indication of the first selection to the second game developer system for display of the first selection of the first game developer system of the first virtual object.

In some embodiments, the indication of the first selection of the first game developer system of the first virtual object denies the second game developer system from selecting the first virtual object.

In some embodiments, initiating the change to the first virtual object in the immutable game data corresponding to the first command to generate an updated first virtual object is in response to a director game developer system approving of the change.

In some embodiments, the method can further comprise generating a first representation of the changed first virtual object for display on the first game developer system; and generating a second representation of the changed first virtual object for display on the first game developer system, wherein generating the first and second representations is based on a characteristic of the first and second game developer systems, respectively.

In some embodiments, the characteristic includes at least one of: a processing power, a display capability, network throughput, memory capacity, or type of game developer system.

In some embodiments, generating the first and second representations include at least one of: merging vertices, compressing textures, compressing geometry, or adjusting a size of the first virtual object.

One embodiment discloses a system for editing immutable game data of a game application within a virtual development space, wherein the system includes: one or more processors configured with computer executable instructions that configure the one or more processors to: create virtual development space, wherein the virtual development space enables a plurality of game developer systems to edit immutable game data associated with virtual objects of the game application, wherein the virtual development space includes a three-dimensional simulated space instanced on a computer server that is accessible by a plurality of game developers systems and that are located remotely from the computer server to edit immutable game data, wherein the immutable game data includes at least a first virtual object; connect a first game developer system to the virtual development space; connect a second game developer system to the virtual development space; receive a first command from the first game developer system to edit the first virtual object in the virtual development space; initiate a change to the first virtual object in the immutable game data corresponding to the first command to generate an updated first virtual object; and transmit the updated first virtual object to the second game developer system.

In some embodiments, the one or more processors are further configured to: generate a playable instance of a game by based on the immutable game data, wherein the immutable game data includes the updated first virtual object, wherein the immutable game data is not changable by players of the playable instance of the game.

In some embodiments, to connect the first game developer system includes generating a first avatar associated with the first game developer system, and transmitting a location of the first avatar to the first and second game developer systems to display the first avatar at the location.

In some embodiments, the one or more processors are further configured to: receive a request to move the first avatar from the location to a new location; and transmit the new location of the first avatar to the second game developer system to display the first avatar in the new location on the second game developer system.

In some embodiments, the one or more processors are further configured to: receive from the first game developer system a first selection of the first virtual object in the virtual development space; and transmit an indication of the first selection to the second game developer system for display of the first selection of the first game developer system of the first virtual object.

In some embodiments, the indication of the first selection of the first game developer system of the first virtual object denies the second game developer system from selecting the first virtual object.

In some embodiments, to initiate the change to the first virtual object in the immutable game data corresponding to the first command to generate an updated first virtual object is in response to a director game developer system approving of the change.

In some embodiments, the one or more processors are further configured to: generate a first representation of the changed first virtual object for display on the first game developer system; and generate a second representation of the changed first virtual object for display on the first game developer system, wherein generating the first and second representations is based on a characteristic of the first and second game developer systems, respectively.

In some embodiments, the characteristic includes at least one of: a processing power, a display capability, network throughput, memory capacity, or type of game developer system.

In some embodiments, to generate the first and second representations include at least one of: merging vertices, compressing textures, compressing geometry, or adjusting a size of the first virtual object.

For purposes of present disclosure the term "mutable game data" refers to game data and game state data that can be changed or modified by users during execution of the game application. Mutable game data can refer to state changes within the game environment caused by the execution of the user actions. The state changes may be persistent (e.g., such as completion of a quest or destruction of a building) or transitory (e.g., movement of the character within the game environment).

For purposes of the present disclosure "immutable game data" refers to game data and game state data that cannot be changed by users during execution of a game application. Immutable game data refers to the game code that is used to generate an executable instance of a game application and defines the rules for execution and operation of the game application. Immutable game data can be edited outside of the confines of the execution of a game session of the game application. For example, immutable game data can be modified during execution of a development mode of the game application.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

I. Overview

Figure 1:
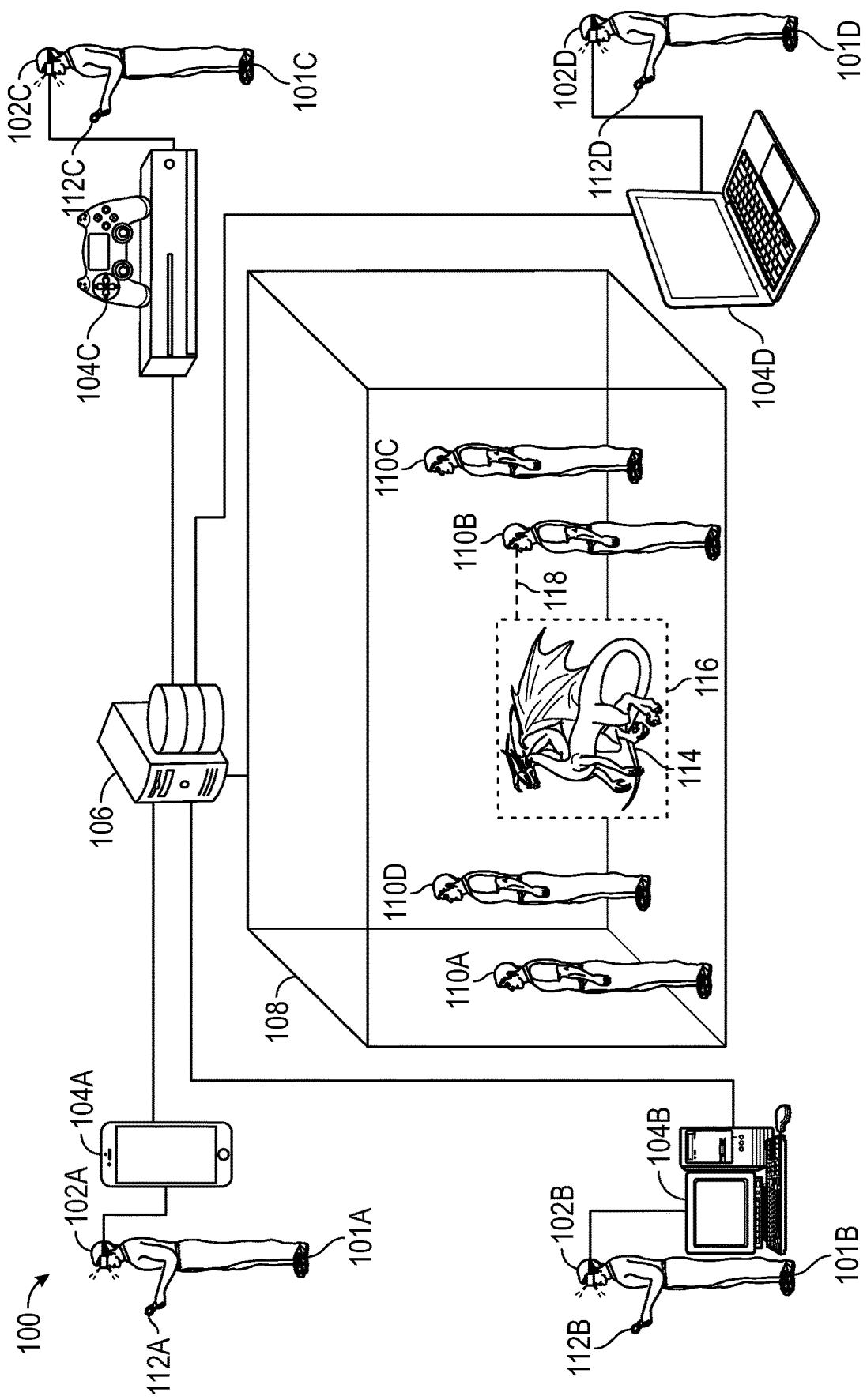
FIG. 1 illustrates an embodiment of a computing environment for the editor hub creating a virtual space for multi-developer editing.

Virtual reality game development are typically performed serially, such as in an assembly line, where one game developer creates or modifies virtual content, and then another game developer loads the created or modified virtual content to perform further modifications. As such, game development can run into delays as one game developer may not be able to perform modifications until the previous game developer completes his or her task. Furthermore, game developers typically cannot remotely edit the same virtual content at the same time. Moreover, because of the serial nature of virtual reality game development, game developers cannot simultaneously provide input to create a collaborative environment for editing the same virtual environment.

The techniques described herein provide an editor hub that can host a virtual environment and allow multiple game developer systems to connect to. The editor hub can manage some or all change requests by connected game developers and execute the change requests to immutable game data into the runtime version of the data. For example, a game developer interacting with virtual content in a connected runtime version of the virtual environment can signal to the editor hub to make a change to the virtual content. The editor hub can execute the requested changes from all connected runtime interactions of the virtual space that includes the virtual content for a plurality of connected game developers. Each requested change can be propagated through a build pipeline, and cache of the build results can be stored with a unique identifier.

In some embodiments, the connected game developers can receive the same cached build results from the build pipeline, which can allow for simultaneous updates for the plurality of game developers working together within the same virtual space. The editor hub can provide user interface controls for the game developers and/or can facilitate change requests from some or all connected game developers.

Advantageously, multiple game developers can assist each other in making modifications to a shared version of the immutable game data, such as to a particular virtual content in the virtual space that cannot be changed by users during execution of a game application. Avatars of the game developers can be displayed to display the location of each game developer in the virtual space on the display of each game developer system. The avatars can stand near virtual objects and make selections of the virtual objects. The editor hub can generate an indication of a selection of a virtual object and broadcast the selection to other developers, showing the intent of the game developer to make a modification on a virtual content in the immutable game data. The location of the avatar for the game developers, the selection of virtual content, and the modifications performed on the virtual content can be broadcasted to other game developers connected to the editor hub. The avatars can bring remote developers into a close virtual proximity creating a collaborative environment, as if the developers were in a meeting room working together. The modification requests can be routed to the editor hub, which executes each action and triggers a build system that caches the results to be presented to multiple runtime game developer systems connected to the same cache identifier.

A development version of the game application can be executed on a game developer computing device that creates a virtual development space. Multiple game developers can modify the immutable game data of the video game within a virtual development space. For example, within the virtual development space multiple game developers can modify virtual content, new virtual content can be created or existing content deleted, and/or the like. The immutable game data can be changed within the virtual development space at the same time, whereas traditional systems may have conflict issues where game developers are modifying the same virtual content at the same time.

In some embodiments, systems and methods can include a feedback loop such that when one game developer makes a change, the change can be broadcasted to other developers to see the change within the virtual development space. Advantageously, all connected game developer systems that have run-times of the virtual space can see that change in real time.

As game developers connect to the same virtual development space and make modifications to the same virtual content, delays between dependent tasks for game development can be reduced and efficiency greatly improved with immediate feedback from other game developers related to any changes. Game developers can connect to a single virtual space creating synergy by bouncing ideas off of each other in real time. For example, a developer can recommend a change of color of the scales of a dragon. The change of the color of the dragon can be displayed on the display of other game developer systems. Another game developer can approve of the general color but recommend a darker shade of the color. The shade of the color may be changed to a darker color, and the original developer may decide to revert the color of the scales back to the original color, deciding that the darker shade of color may be sufficient on its own.

Moreover, the quality and process of the decision making can be improved with a director that coordinates the efforts of other game developers. The director can make suggestions, point to a particular virtual content (or aspect of the virtual content) for developers to focus on, approve or disapprove modifications, and/or the like. For example, a director may be guiding each game developer as the game developers work on the dragon. The director may assign one developer to work on the shape of the scales and another developer to work on the size and color. The director can request a change to one developer and request feedback on how that change could affect the work of another developer in real time. Thus, game developers with different expertise can collaborate together in a single virtual environment by displaying immediate change requests across various game developer platforms.

In some embodiments, the system can enable live updates on all modifications in run-time views across multiple and different platforms. For example, the modifications can be implemented by an editor hub, and the editor hub can update the modifications accordingly to be displayed across different platforms of the game developers, such as a personal computer, a virtual reality console, or a gaming console. Platforms can have different characteristics, such as processing power or display capability. As such, the editor hub can update the modifications according to each platform, such as merging vertices or compressing geometry, according to the capability of the platform.

Once game editing is complete on the immutable game data, the editor hub or other system can generate a playable instance of the game based on the immutable game data and deploy a game instance that includes mutable game data, where the immutable game data is not changeable by players of the playable game instance, but mutable game data can be changed or modified by users during execution of the game instance.

II. Examples of Computing Environment for Implementation of Multi-User Editing of Virtual Content FIG. 1 illustrates an embodiment of a computing environment 100 for the editor hub 106 creating a virtual space 108 for multi-developer editing according to the present disclosure. The computing environment 100 can include game developer computing systems 104A, 104B, 104C, 104D (collectively referred to herein as game developer computing systems 104), an editor hub 106, and a virtual space 108. To simplify discussion and not to limit the present disclosure, FIG. 1 illustrates only one of certain elements (for example, a single editor hub 106), though multiple systems may be used.

The game developer computing systems 104A, 104B, 104C, 104D can include virtual reality headsets 102A, 102B, 102C, 102D (collectively referred to herein as virtual reality headsets 102) and input devices, such as virtual reality controllers 112A, 112B, 112C, 112D (collectively referred to herein as input devices 112) usable by game developers 101A, 101B, 101C, 101D. The game developer computing systems 104 can include a mobile phone, a desktop, a laptop, a gaming console, or the like.

The editor hub 106 can include one or more processors executing computer readable instructions for creating a virtual space 108 that the game developer computing systems 104 can connect to. Although certain network connections are illustrated between systems and devices, multiple distinct and/or distributed networks may exist. The network may include a local network.

The game developer computing systems 104 may be associated with the development of a video game application. For example, the game developer computing systems 104 can be configured to load at least a portion of the video game application and/or a virtual space 108 for the video game application created by the editor hub 106, such as loading immutable game data to be modified by game developer computing systems 104.

A game developer 101 may use the game developer computing systems 104 to control an avatar 110A, 110B, 110C, 110D (collectively referred to herein as avatars 110) or other indication of the game developer 101 in the virtual space 108. The avatars 110 can be seen by each of the game developers 101. The avatars 110 can help the game developers 101 identify what the other game developers 101 are focusing on in the virtual space 108. For example, game developer 101A can be associated with avatar 110A and can control the movement of the avatar 110. The game developer 101A can see the other avatars 110B, 110C, 110D of the other game developers 101B, 101C, 101D.

The editor hub 106 can generate the avatars 110 for each game developer 101 and transmit the current location of the avatars 110 to the connected game developer computing systems 104. The editor hub 106 can receive commands for the avatars 110 from the game developer computing systems 104 and employ the commands in the virtual space 108, such as moving the avatars 110 from one location to another.

In some embodiments, the game developer computing systems 104 can select virtual content in the virtual space 108. For example, the game developer computing system 1048, via the avatar 1108 and the virtual reality controller 1128, can select 118 a dragon 114 in the virtual space 108. The command for the selection 118 can be sent to the editor hub 106, which can generate an indication 116 of the selection 118 to be sent to the other game developer computing systems. The indication 116 of the selection 118 can be sent to the other game developer computing systems 104A, 104C, 104D. As such, the other game developer computing systems 104A, 104C, 104D can see that the game developer computing system 1048 currently selected the dragon 114. In some embodiments, the indication 116 can include a color, size, texture, outline, an enclosure (such as a box or circle around the selected virtual content), and/or the like. The indication 116 can include a pointer, such as a laser pointer, from the associated avatar to the virtual content.

A. Game Developer Computing System

Figure 9:
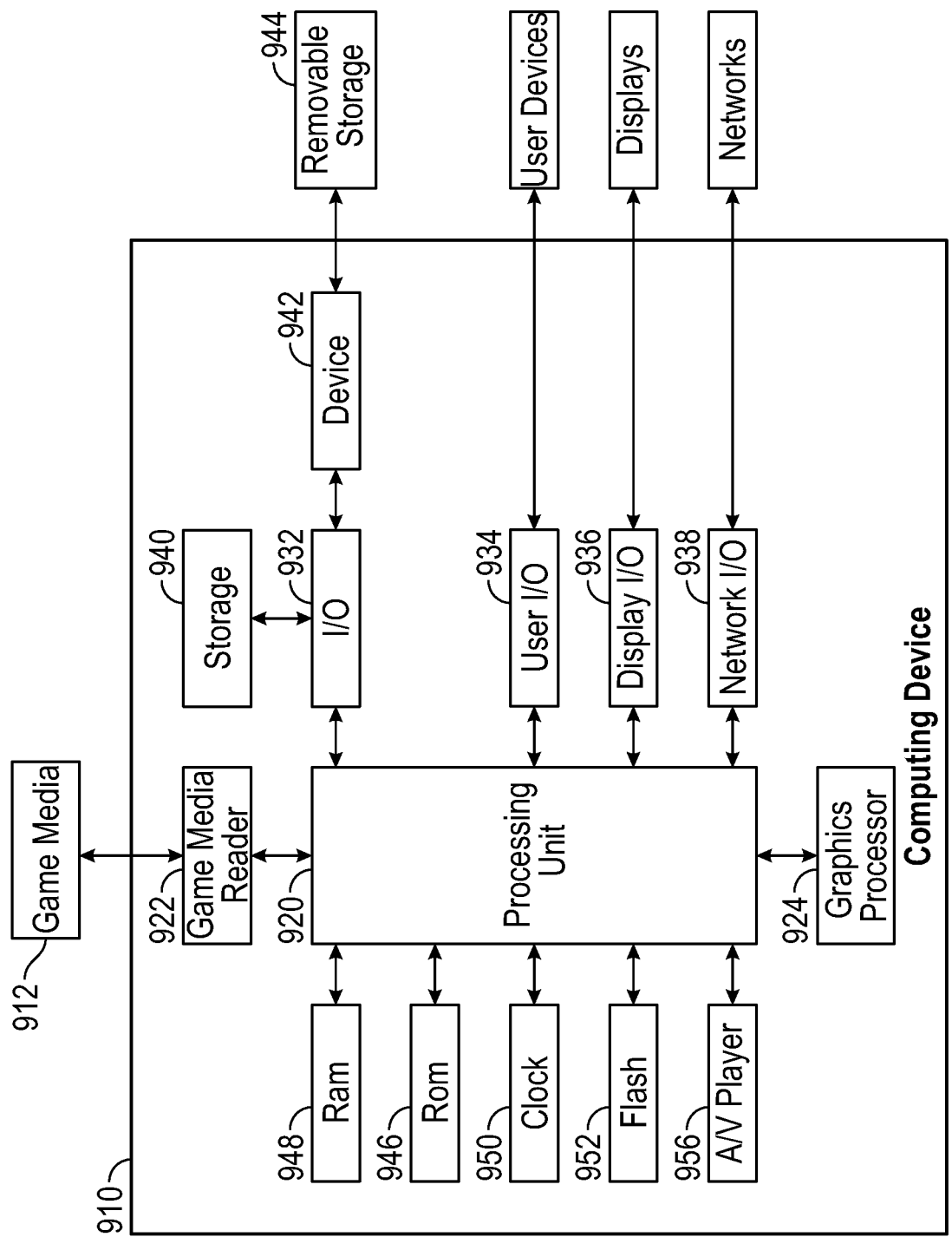
FIG. 9 illustrates an embodiment of computing device.

The game developer computing system 104 may be implemented on a computing device, such as computing device 910 shown in FIG. 9. The game developer computing system 104 may include hardware and software components for establishing communications over a communication network 180. For example, the game developer computing system 104 may be equipped with networking equipment and network software applications that facilitate communications via one or more networks (for example, the Internet or an intranet). The game developer computing system 104 may have varied local computing resources such as central processing units and architectures, memory, mass storage, graphics processing units, communication network availability and bandwidth, and so forth. Further, the game developer computing system 104 may include any type of computing system, such as, for example, desktops, laptops, game application platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the game developer computing system 104 may include one or more of the embodiments described below with respect to FIG. 9.

The game developer computing system 104 may include virtual reality platforms and/or non-virtual reality platforms. Virtual reality platforms may refer to platforms that allow users of a game to interact with a virtual space as the users would interact with the real world. The virtual reality platforms may provide one or more sensory experience that simulates the users' presence in the virtual space. Sensory experience provided by virtual reality platforms may include one or more of experience based on sight, touch, hearing, smell and/or other sensory experience. As non-limiting examples, the virtual reality platforms may include one or more of a virtual reality headset display, a motion controller, a haptic generator, and/or other virtual reality platforms.

In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

Virtual reality platforms may present views of the online game in a manner that simulates the users' immersion within the online game. The online game may have a higher interactive potential when played via the virtual reality platforms than when played via the non-virtual reality platforms. For example, the virtual reality platforms may be able to support additional and/or increased motion inputs, views, visibility, feedback and/or other interactions a user may have with the online game.

The game developer computing system 104 may include hardware and software components for establishing communications over a communication network. For example, the game developer computing system 104 may be equipped with networking equipment and network software applications (for example, a web browser) that facilitate communications via one or more networks (for example, the Internet or an intranet). The game developer computing system 104 may have varied local computing resources such as central processing units and architectures, memory, mass storage, graphics processing units, communication network availability and bandwidth, and so forth. Further, the game developer computing system 104 may include any type of computing system. For example, the game developer computing system 104 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the game developer computing system 104 may include one or more of the embodiments described below with respect to FIG. 9.

Typically, the game developer computing system 104 is capable of executing a game application, such as a video game, that may be stored and/or executed in a distributed environment. For example, the game developer computing system 104 may execute a portion of a game and the editor hub 106 may execute another portion of the game. For instance, the game may be a massively multiplayer online role-playing game (MMORPG) that includes a client portion executed by the game developer computing system 104 and a server portion executed by the editor hub 106. For the present discussion, the video game developer virtual space can include a distributed application or an application that includes a portion that executes on the game developer computing system 104 and a portion that executes on the editor hub 106, or other game hosting system. The video game developer virtual space can be loaded into memory on the game developer computing system 104 and can act as an interface or hub for one or more game applications that interfaces with the editor hub 106.

B. Editor Hub

The editor hub 106 can be capable of executing a video game development platform and generating a virtual development space 108 for the game developer computing systems 104 to connect to. For example, the video game development platform and/or the virtual space 108 may be executed by a virtual machine, or a virtual server instance executing the video game development application in the virtual environment. In certain implementations, the game developer computing system 104 may execute a portion of a video game development platform and the editor hub 106 may execute another portion of the video game development platform. In some embodiments, the video game development application can include a distributed application or an application that includes a portion that executes on the game developer computing system 104 and a portion that executes on the editor hub 106.

The editor hub 106 can include a server and an electronic storage. The electronic storage may include electronic storage media that electronically stores information. The electronic storage may store software algorithms, information determined by processor, information received remotely, information received from server(s), information received from the game developer computing systems 104, and/or other information that enables systems and/or server(s) to function properly. For example, the electronic storage may store information relating to an online game, information relating to a game instance of an online game, information relating to virtual reality platforms and non-virtual reality platforms, information relating to objectives, information relating to rewards, information relating to one or more computer components, and/or other information.

The editor hub 106 may be configured to communicate with one or more game developer computing systems 104 according to a client/server architecture, and with each other. The editor hub 106 may include one or more processors configured to execute one or more machine readable instructions. In some implementations, game developer computing systems 104 may include one or more computer program components that are the same as or similar to the computer program components of physical processor to facilitate in game actions.

Game instance components of the game developer computing systems 104 may execute a game instance of the online game. The game instance may include the virtual reality content. Virtual reality content may refer to content in the online game that requires interaction via virtual reality platforms. Virtual reality content may require input from virtual reality platforms and/or output to virtual reality platforms. For example, virtual reality content may require one or more movements and/or gestures of a user (e.g., hand motion, head motion, body motion, etc.) registered by the virtual reality platforms to interact with the virtual reality content. As another example, virtual reality content may provide output from the online game via the virtual reality platforms (e.g., displaying views of the game instance, generating vibrations, etc.).

The game instance of the online game may comprise a simulated virtual space, e.g., a virtual space that is accessible by users via clients (e.g., the game developer computing systems 104) that present the views of the virtual space to a user. The virtual space may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

It should be understood the above description of the manner in which state of the virtual space associated with the online game as determined by the editor hub 106 is not intended to be limiting. The editor hub 106 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

The editor hub 106 may be configured to use the game instance to generate game state information that is transmitted to the game developer computing systems 104 over a network. The execution of the instance of the online game by the editor hub 106 may include determining a game state associated with the online game. The game state information may facilitate presentation of views of the online game to the users via the game developer computing systems 104. The game state information may include information defining the virtual space in which the online game is played.

The editor hub 106 may be configured to transmit the game state information over network to the game developer computing systems 104, causing the game developer computing systems 104 to present views of the online game. The game state information may be communicated (e.g., via streaming visual data, via object/position data, and/or other state information) from the editor hub 106 to the game developer computing systems 104 for presentation to users.

The game state information determined and transmitted to a game developer computing system 104 may correspond to a view for a user character being controlled by a user via the given game developer computing systems 104. The state determined and transmitted to a given game developer computing systems 104 may correspond to a location in a virtual space associated with the online game. The view described by the game state information for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

Views of the online game presented via a virtual reality platform may include views presented on a virtual reality headset display (e.g., a head-mounted display device, etc.). The views may be presented stereoscopically—one for each eye—via the virtual reality headset display and the user's brain may combine them to create a three-dimensional experience. The virtual reality headset display may include a head tracking system that tracks movement (e.g., position, orientation, change in position, change in orientation, etc.) of the users as they move their heads and/or move around the environment. The virtual reality headset display may include a sensor system (e.g., image sensor system, distance sensor system, etc.) that track movement of the users' body parts (e.g., user's hands, arms, feet, legs, etc.) and/or objects (e.g., glove, wand, controller, markers, etc.). Views of the online game presented via a non-virtual reality platform may include views presented on a display for one or more of a mobile device (e.g., a smart phone, tablet, laptop, etc.), desktop computer, gaming console, televisions, and/or other non-virtual reality platforms.

The execution of the game instance may enable interaction by the users with the online game and/or each other. The editor hub 106 may be configured to perform operations in the game instance in response to commands received over network from the game developer computing systems 104. Within the instance of the online game, users may interact with elements in the online game and/or with each other through gameplays provided by the online game.

Users may participate in the online game through client game applications implemented on the game developer computing systems 104 associated with the users. Within the game instance of the online game executed by the editor hub 106, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

The user controlled element(s) may move through and interact with the virtual space (e.g., user-virtual space units in the virtual space, non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Controls of virtual elements in the online game may be exercised through commands input by a given user through the game developer computing systems 104. The given user may interact with other users through communications exchanged within the virtual space. Such communications may include one or more of textual chat, instant messages, private messages, voice communications, and/or other communications. Communications may be received and entered by the users via their respective game developer computing systems 104. Communications may be routed to and from the appropriate users through server(s) (e.g., through the editor hub 106).

Execution and/or performance of the user action by the editor hub 106 may produce changes to the game state, which may reflect progresses and/or results of the user actions. In some examples, state changes caused by the execution of the user actions may be recorded in the electronic storage to facilitate persistency throughout the instance of the online game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via a virtual reality platform, a given user may input a broad range of commands. The input commands via virtual reality platform may include the user performing the action as an input command. Based on the user's actions in the real world, the user may be able to look around, move about, and/or otherwise act within the virtual space in which the online game is played.

The instance of the online game may comprise virtual entities automatically controlled in the instance of the online game. Such virtual entities may or may not be associated with any user. As such, the automatically controlled virtual entities may be generated and/or developed by artificial intelligence configured with server(s) by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with server(s). As used herein, such automatically controlled virtual space entities in the instance of the online game are referred to as "non-player entities."

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

In one aspect of the disclosure, virtual reality content in an online game may be provided by determining whether the users of the online game are attempting to join the game instance via the virtual reality platforms or the non-virtual reality platforms. Access to the game instance may be provided to users attempting to join the game instance via one or more of the virtual reality platforms. Access to the game instance may be denied to users attempting to join the game instance via one or more of the non-virtual reality platforms.

C. Virtual Space/Environment

As used herein, a virtual space 108 may comprise a simulated space (e.g., a physical space) instanced on a server (e.g., server on the editor hub 106) that is accessible by a game developer system located remotely from the server, to format a view of the virtual space 108 for display to a user of the client. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual space 108, and/or surface features of a surface or objects that are "native" to the virtual space 108. In some implementations, the topography may describe a surface (e.g., a ground surface) that runs through at least a substantial portion of the virtual space 108. In some implementations, the topography may describe a volume with one or more bodies positioned therein (e.g., a simulation of gravity-deprived space with one or more celestial bodies positioned therein). A virtual space 108 may include a virtual world, but this is not necessarily the case. For example, a virtual space 108 may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

C. Network

The network that connects the editor hub 106 to the game developer systems 104 can include any type of communication network. For example, the network can include one or more of a wide area network (WAN), a local area network (LAN), a cellular network, an ad hoc network, a satellite network, a wired network, a wireless network, and so forth. In some embodiments, the network can include the Internet.

III. Examples of Varying Fields of View for Game Developers

Figure 2:
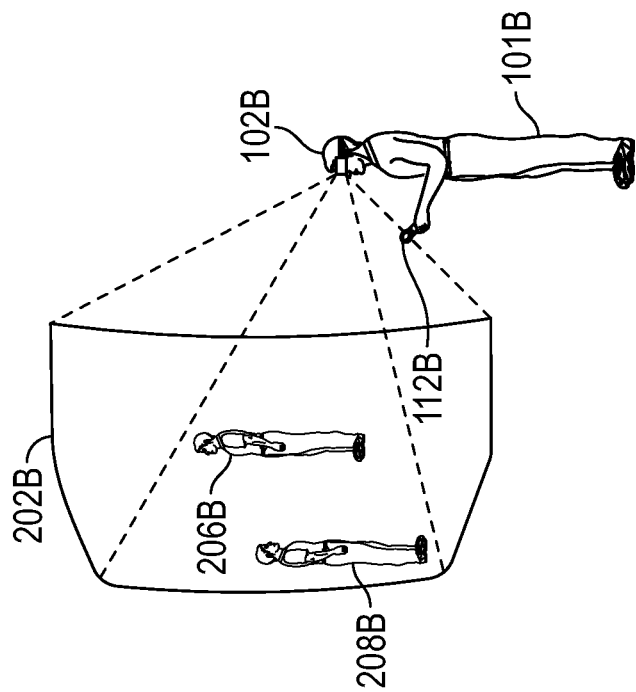
FIG. 2 illustrates an embodiment of varying fields of view for game developers.
Figure 2:
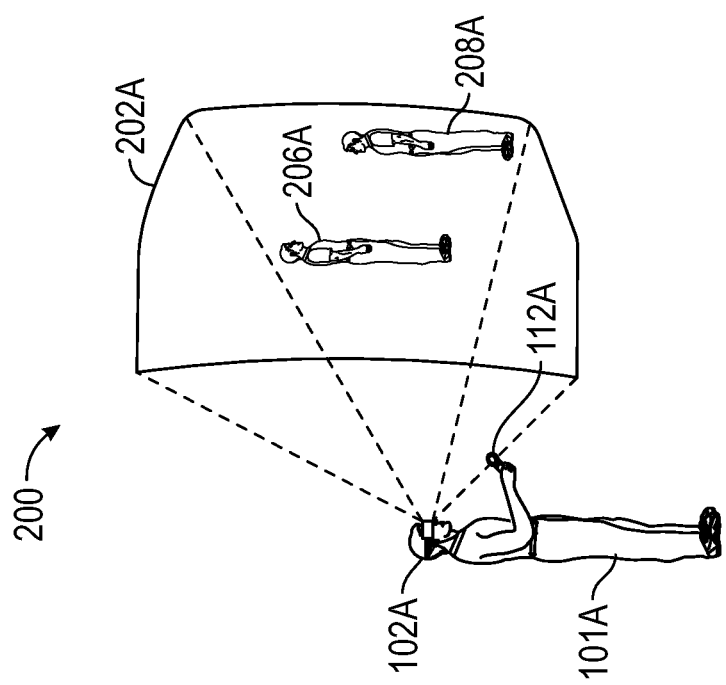

FIG. 2 illustrates an embodiment 200 of varying fields of view for game developers. The game developer 101A can be using a virtual reality controller 112A to control avatar 206A. The editor hub 106 of FIG. 1 can employ the change in the avatar 206A. The editor hub 106 can identify the game developer computing system 104A and modify the field of view 202A for the game developer computing system 104A, and can identify the game developer computing system 104B and modify the field of view 202B for the game developer computing system 104B. Then, the field of view 202A can be displayed on the virtual reality head set 102A and the field of view 202B can be displayed on the virtual reality head set 102B, where the field of view 202A and 202B can be different. The field of view 202A and 202B can be from behind the associated avatar 206A and 206B respectively. The field of view 202A and 202B can be from the viewpoint of the avatar 206A and 206B respectively. As shown in the field of view 202A, the field of view for the game developer 101A is behind the developer's avatar 206A and shows the avatar 208A for game developer 101B. The field of view 202B for the game developer 101B is behind the developer's avatar 206B and shows the avatar 208B for game developer 101B at a different angle based on the different field of view.

IV. Examples of Virtual Content Modification

Figure 3A:
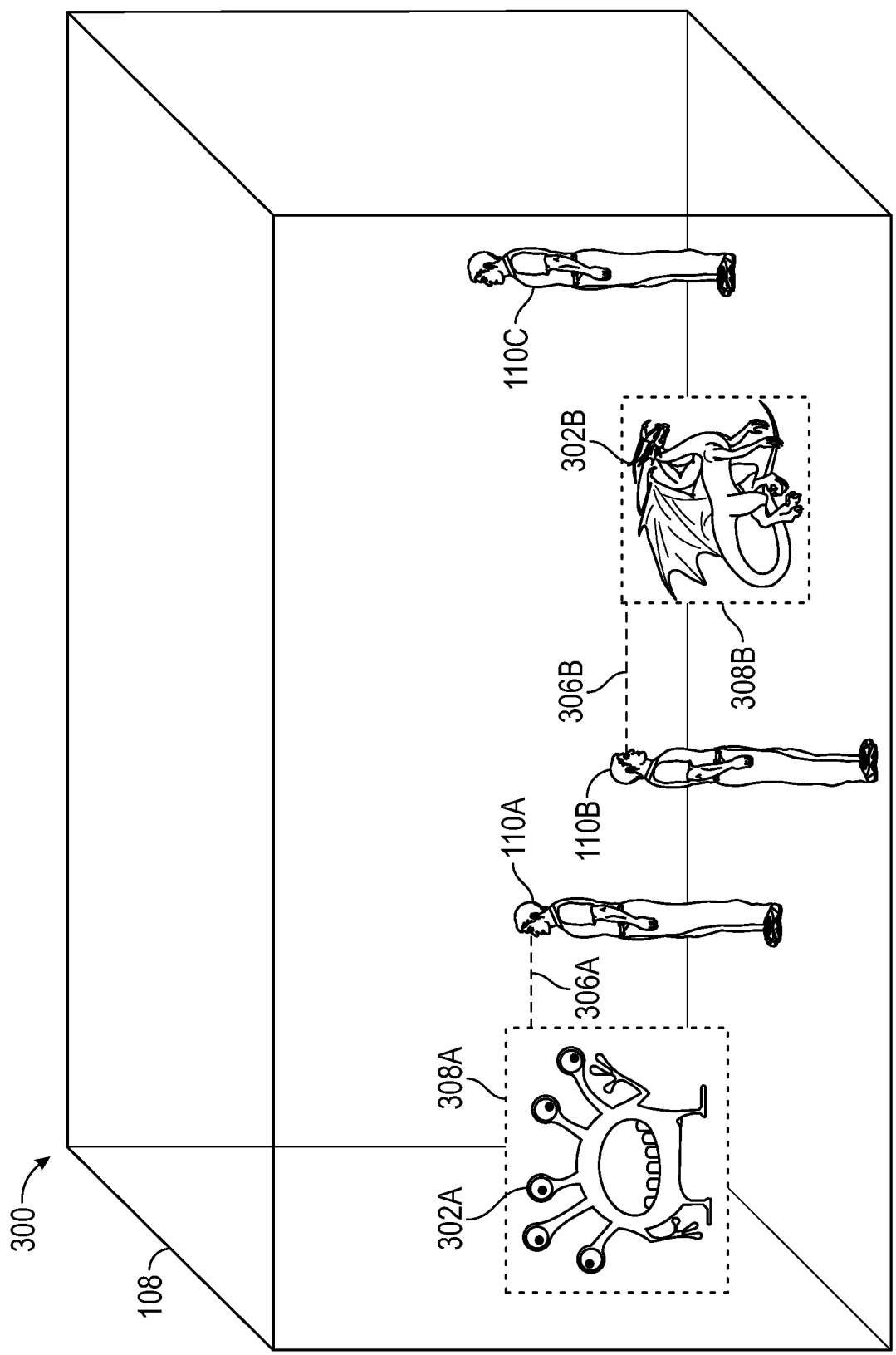
FIGS. 3A and 3B illustrate embodiments of virtual content modification by multiple game developers and a director.
Figure 3B:
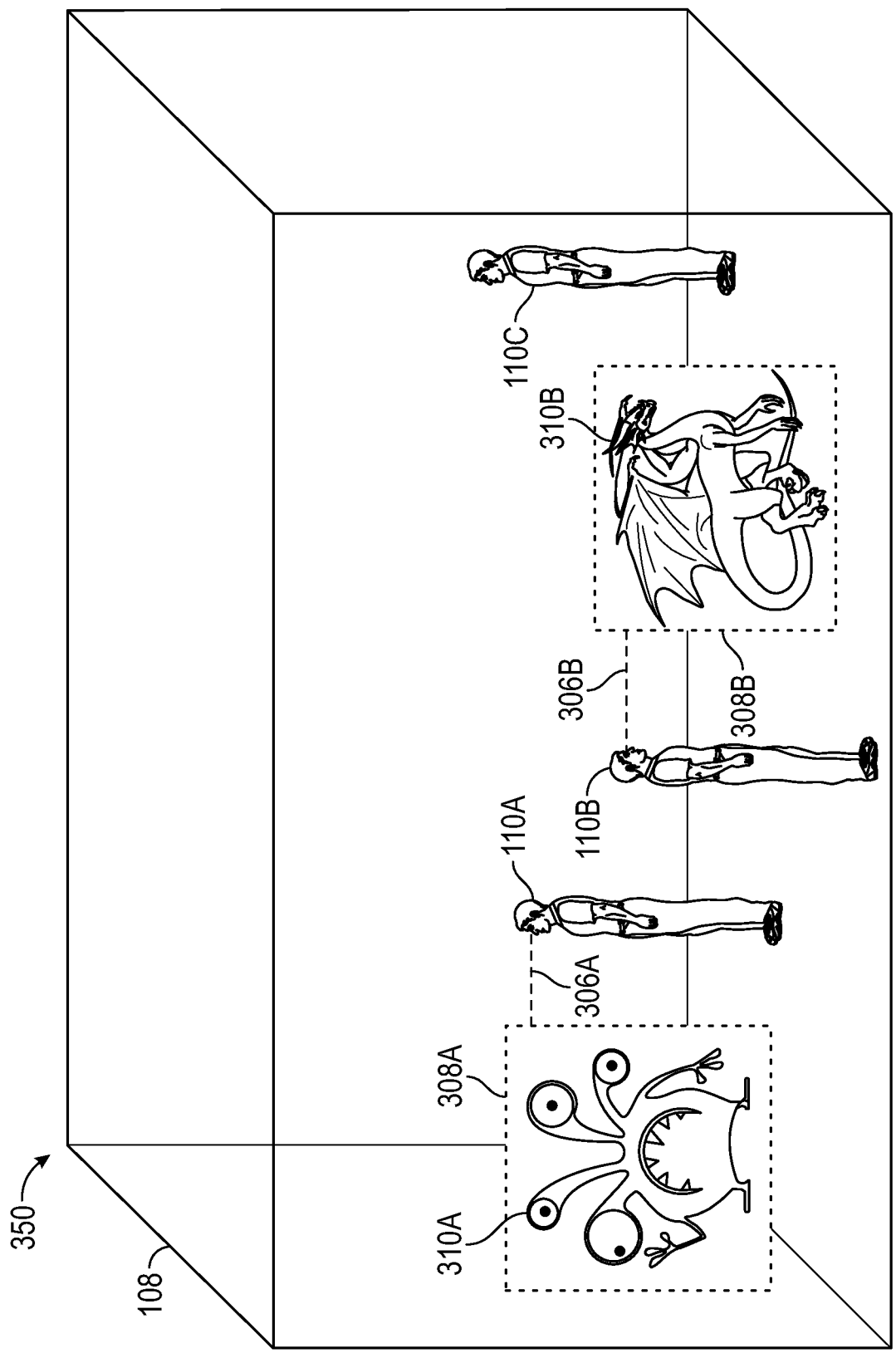

FIGS. 3A and 3B illustrate embodiments 300 and 350 of a virtual development space with multiple game developers and a director. The editor hub can create the virtual development space 108. The game developer computing systems can connect to the virtual development space change, manipulate, and/or create immutable game data of the game application. Game developers can control respective avatars 110A, 110B, 110C in the virtual space 108.

In FIG. 3A, avatar 110A selects virtual content 302A, a five-eyed monster, via the indicator 306A. The selection is displayed via the box 308A indicating to the other game developers that the virtual content 302A has been selected. Avatar 110B selects another virtual content 302B, a dragon, via the indicator 306B, which is shown by the box 302B. Avatar 110C can be a director for the virtual space.

In FIG. 3B, avatar 110A makes modifications to the virtual content 302A to generate virtual content 310A (e.g. less eyes and different teeth) and avatar 110B makes modifications to virtual content 302B to generate virtual content 310B (e.g. a larger dragon). Avatar 110C can act as the director approving or not approving the modifications suggested by the other avatars.

IV. Examples of Editor Hub Mechanisms

Figure 4:
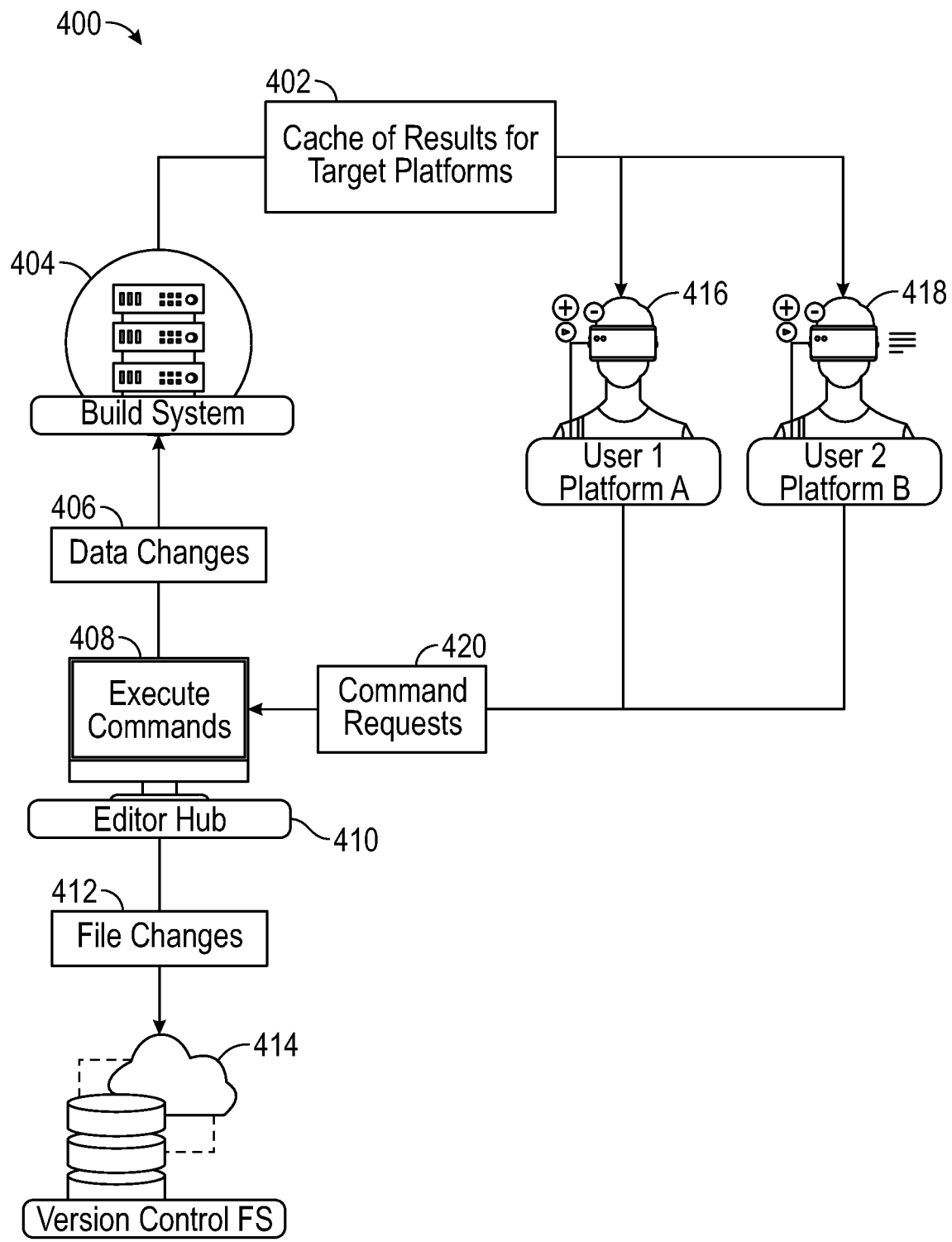
FIG. 4 illustrates an embodiment of editor hub mechanisms.

FIG. 4 illustrates an embodiment 400 of editor hub mechanisms. The embodiment 400 can include a User 1 Platform A 416, a User 2 Platform B 418, a cache of results from target platforms 402, a build system 404, a data changes module 406, an execute commands mobile 408, a command requests module 420, an editor hub 410, a file changes module 412, and a version control file storage 414.

The editor hub 410 can communicate with user platforms, such as the User 1 Platform A 416 and a User 2 Platform B

418 by receiving commands via the command request module 420. For example, the User 1 Platform A 416 and the User 2 Platform B 418 can send a command to move an avatar or modify virtual content in a virtual space.

The editor hub 410 can execute the commands received from the command requests module 420 via the execute commands module 408. After the editor hub 410 executes the commands via the execute commands module 408, the file changes module 412 can change the immutable game data and store a new version of the immutable game data in the version control file storage 414. After the editor hub 410 executes the commands via the execute commands module 408, the data changes module 406 can modify the immutable game data and send the modified immutable game data to the build system 404. The build system can take the immutable game data changes and processes the immutable game data changes for varying platforms to produce a cache of the updates. The cache of results can be saved for each target platforms 402. Then, the User 1 Platform A 416 and the User 2 Platform can see the changes. As such, the game developers can edit the immutable game data that ultimately gets built and distributed to the run-time platforms.

V. Examples of Editors and Game Developer Platforms

Figure 5A:
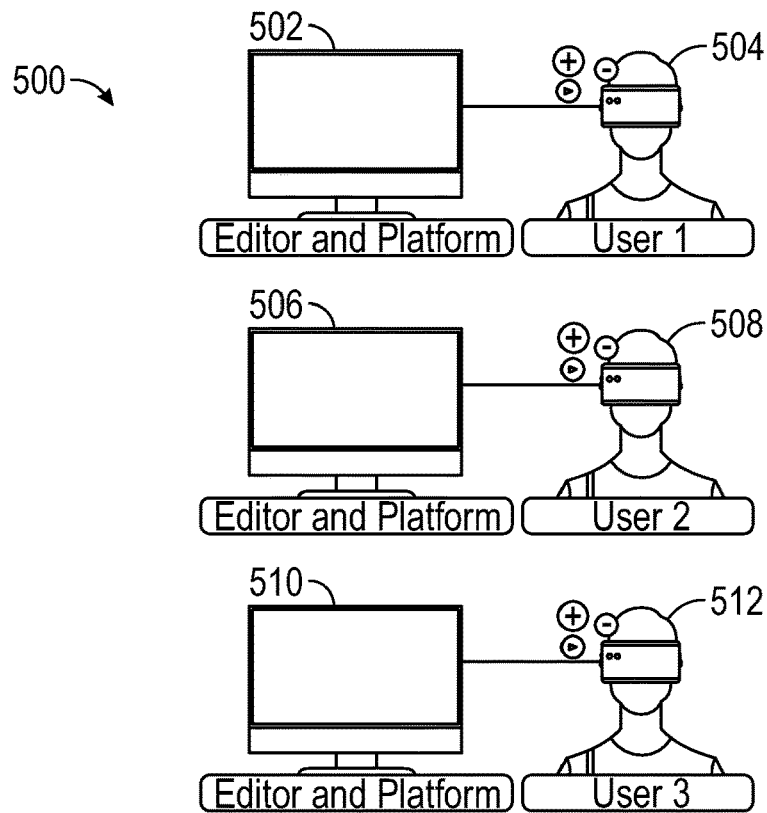
FIG. 5A illustrates an embodiment of individual editors connected to each user platform.

FIG. 5A illustrates an embodiment 500 of individual editors connected to each user platform. In the embodiment 500 of FIG. 5A, each game developer 504, 508, 512 edits a virtual space via individual editor platforms 502, 506, 510, respectively. Consequently, each platform is running its own version of the editor and each game developer is tied to that instance of the editor. The users, such as User 1 504, User 2 508, User 4 512, can each have a VR headset plugged into the editor and platform 502, 506, 510. However, each update is updating its own virtual space via individual editors tied to the platforms.

Figure 5B:
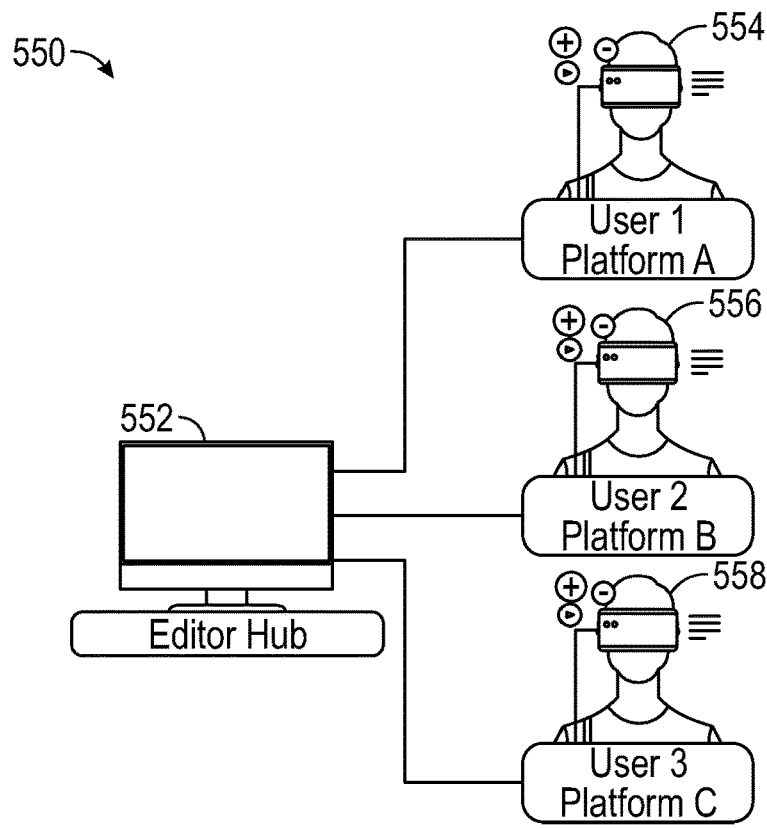
FIG. 5B illustrates an embodiment of a central editor hub connecting to each user platform.

FIG. 5B illustrates an embodiment 550 of an editor hub 552 connected to each user platform, such as User 1 Platform A 554, User 2 Platform B 556, User 3 Platform C 558. The users may be running on different platforms. For example, Platform A 554 may be a desktop, Platform B 556 may be a gaming console, and Platform C 558 may be a mobile device. Each device has a version of the virtual space running and the inputs and outputs on each platform is routed to the editor hub 552 where all of the commands are executed. Then the results are fed back to each of the platforms such that one game development modifications can be seen by others.

VI. Example Processes for Modifying Immutable Game Data

Figure 6A:
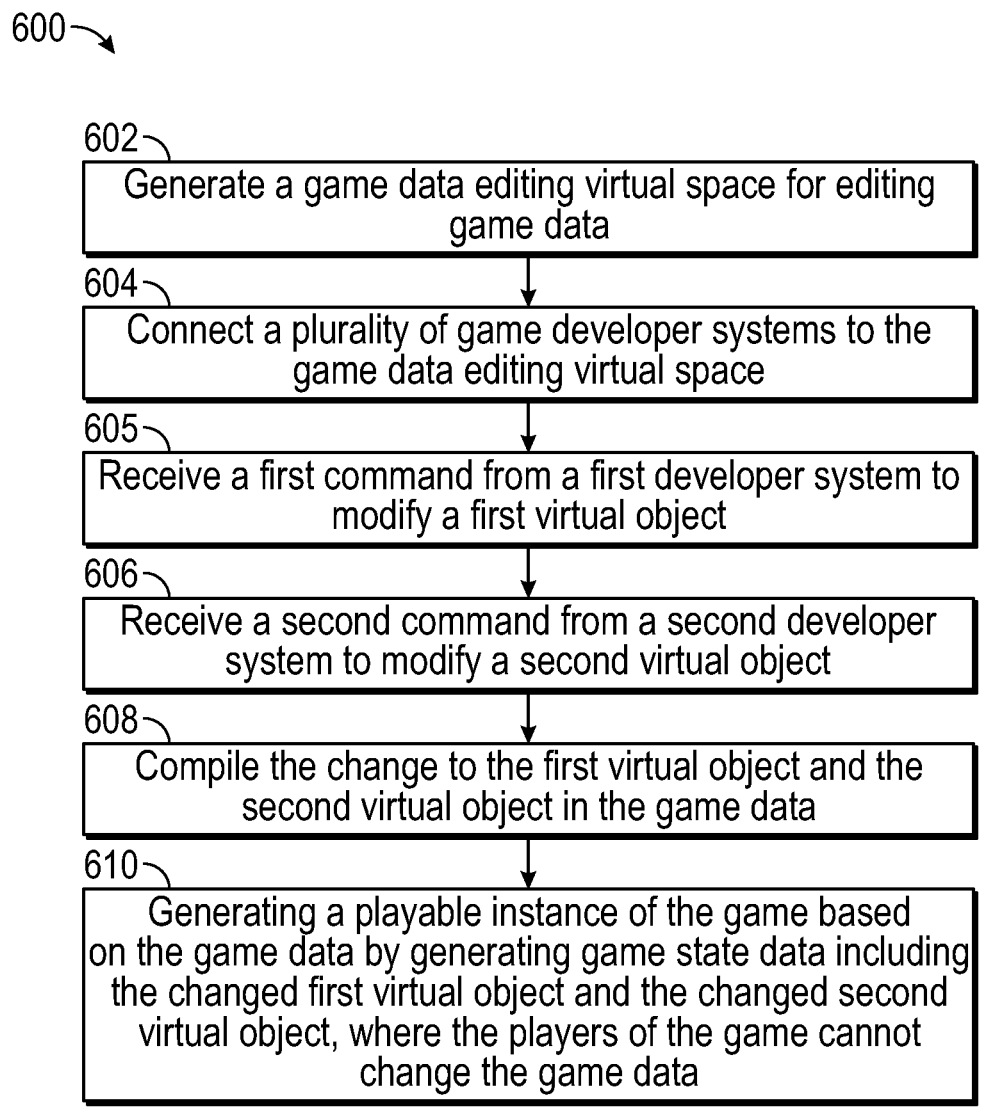
FIG. 6A illustrates a flowchart of an embodiment for modifying immutable game data and generating a playable instance of the game based on the modified immutable game data.

FIG. 6A illustrates a flowchart 600 of an embodiment for modifying immutable game data and generating a playable instance of the game based on the modified immutable game data. The process 600 can be implemented by any system that can modify and/or generate a playable instance of the game. For example, the process 600, in whole or in part, can be implemented by a game developer system 104, an editor hub 106, or other computing system. Although any number of systems, in whole or in part, can implement the process 600, to simplify discussion, the process 600 will be described with respect to particular systems. Further, although embodiments of the process 600 may be performed with respect to variations of systems comprising various game application environments, to simplify discussion, the process 600 will be described with respect to the editor hub 106.

At (602) of the process 600, the editor hub can generate virtual development space for editing immutable game data. The editor hub can allow editing of immutable game data in the virtual development space, immutable game data refers to game data that cannot be modified by players during execution of the game application.

At (604), the editor hub can connect to a plurality of game developer systems. The game developer systems can include a virtual reality headset, a virtual reality controller, a display, a processor, a mobile device, a gaming console, a laptop, a tablet, and/or the like. The game developer system can display the virtual space to the game developer. The editor hub can facilitate movement of avatars for the game developer systems, and execute and broadcast modifications made by game developers.

At (605), the editor hub can receive a first command from the first developer system to modify a first virtual object. At block (606), the editor hub can receive a second command from the second developer system to modify a second virtual object. At (608), the editor hub can compile the changes to the first and second virtual object in the immutable game data. In some embodiments, the editor hub compiles the first command before compiling the second command. In some embodiments, the editor hub compiles both the first and second command at the same time.

At (610), the editor hub generates a playable instance of the game based on the immutable game data. Generating the playable instance includes generating game state data that includes the modified first and second virtual objects. The players of the game cannot change the immutable game data, but may modify the mutable game state data.

VII. Example Processes for Modifying Game Data

Figure 6B:
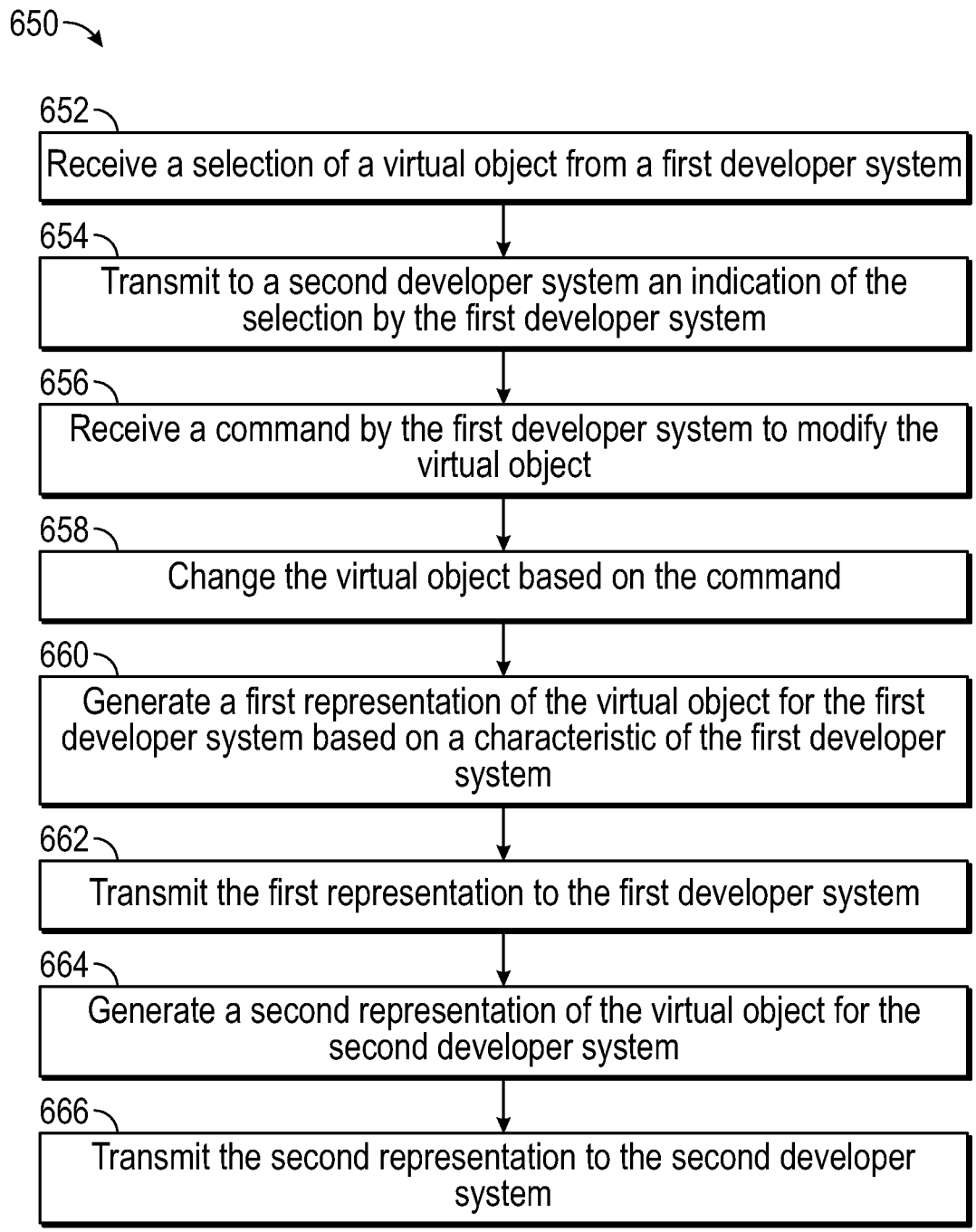
FIG. 6B illustrates a flowchart of an embodiment for modifying immutable game data and broadcasting the change to other game developer platforms.

FIG. 6B illustrates a flowchart 650 of an embodiment for modifying immutable game data and broadcasting the change to other game developer platforms. The process 650 can be implemented by any system that can modify and/or broadcast change of a virtual environment. For example, the process 650, in whole or in part, can be implemented by a game developer system 104, an editor hub 106, or other computing system. Although any number of systems, in whole or in part, can implement the process 650, to simplify discussion, the process 650 will be described with respect to particular systems. Further, although embodiments of the process 650 may be performed with respect to variations of systems comprising various game application environments, to simplify discussion, the process 650 will be described with respect to the editor hub 106.

At (652) of the process 650, the editor hub can receive a selection of a virtual object from a first developer system. At (654), the editor hub can transmit to a second developer system an indication of the selection by the first developer system. As such, the second developer can know that the first developer system is currently working on the virtual object. In some embodiments, the second developer system is not allowed to modify the virtual object when the first developer system made a selection on the virtual object.

At (656), the editor hub can receive a command by the first developer system to modify the virtual object that is selected. At (658), the editor hub can change the virtual object based on the received command by the first developer system.

At (660), the editor hub can generate a first representation of the virtual object for the first developer system based on a characteristic of the first developer system. At (662), the editor hub can transmit the first representation of the virtual object to the first developer system.

At (664), the editor hub can generate a second representation of the virtual object for the second developer system based on a characteristic of the second developer system. At (666), the editor hub can transmit the second representation of the virtual object to the second developer system. For example, if the first developer system is a gaming console, the editor hub can adjust the representation to match a characteristic of the gaming console, such as the processing power or display capability. The second developer system can be a mobile device having further limited processing and display capability.

In some embodiments, the editor hub generates the representations by adjusting the geometry of the virtual objects, changing the size of the virtual objects, reducing the resolution of the virtual objects, merging vertices, compressing textures, and/or the like.

In some embodiments, the editor hub determines the processes to generate the representations by assessing one or more characteristics of the game developer system. Examples of the characteristics can include processing power, display resolution, network throughput, memory capacity, and/or the like.

VIII. Example Processes for Simultaneous Command Handling

Figure 7:
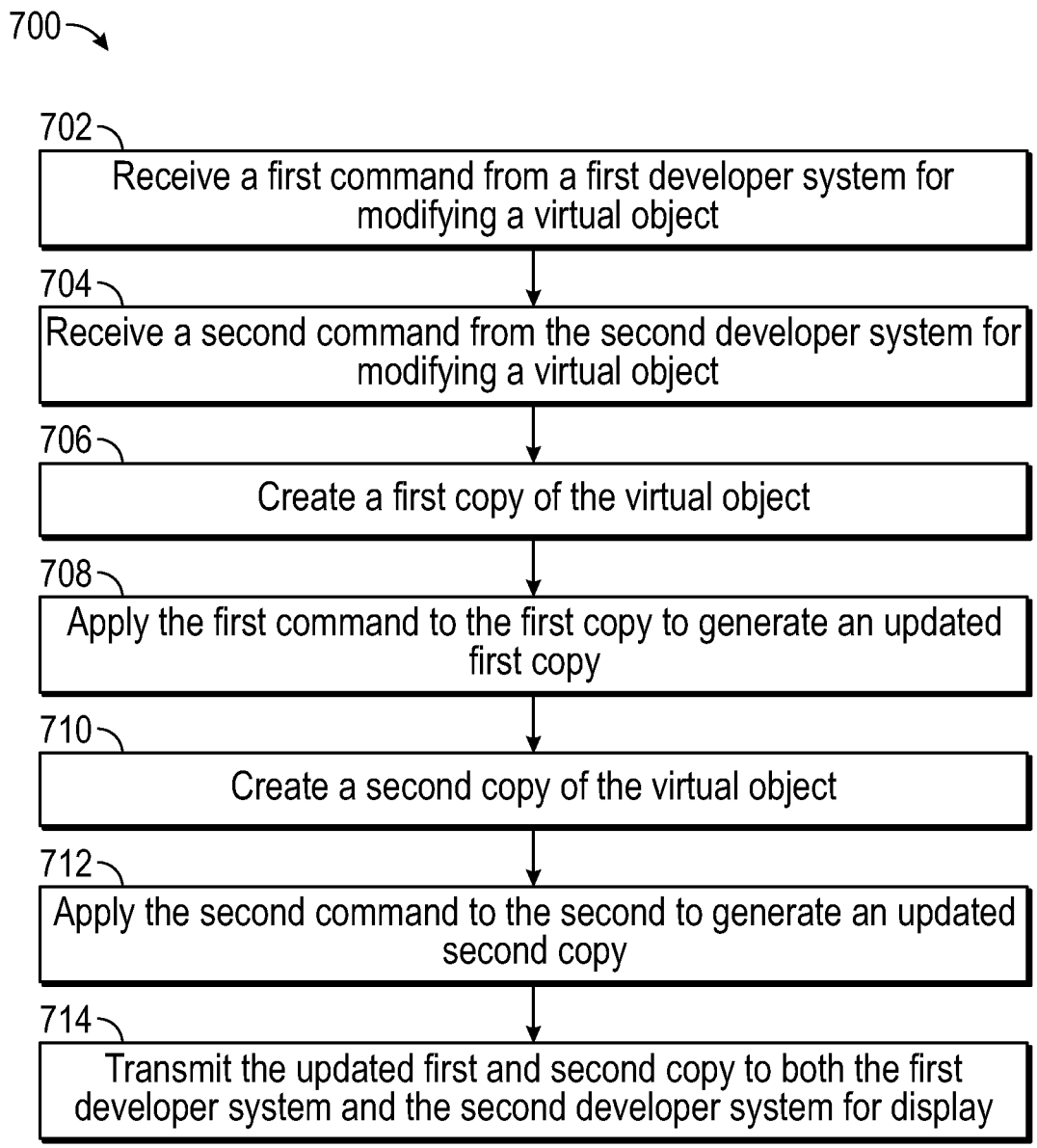
FIG. 7 illustrates a flowchart of an embodiment for simultaneous command handling by generating a second copy of the virtual object.

FIG. 7 illustrates a flowchart 700 of an embodiment for simultaneous command handling by generating a second copy of the virtual object. The process 700 can be implemented by any system that can handle simultaneous commands by generating a second copy of the virtual object. For example, the process 700, in whole or in part, can be implemented by a game developer system 104, an editor hub 106, or other computing system. Although any number of systems, in whole or in part, can implement the process 700, to simplify discussion, the process 700 will be described with respect to particular systems. Further, although embodiments of the process 700 may be performed with respect to variations of systems comprising various game application environments, to simplify discussion, the process 700 will be described with respect to the editor hub 106.

At (702) of the process 700, the editor hub can receive a first command from a first developer system for modifying a virtual object. At (704), the editor hub can receive a second command from a second developer system for modifying the same virtual object.

At (706), the editor hub can create a first copy of the virtual object and at (708) apply the first command to the first copy to generate an updated first copy. At (710), the editor hub can create a second copy of the virtual object and at (712) apply the second command to the second copy to generate an updated second copy. At (714), the editor hub can transmit the updated first and second copy to both the first and second developer systems for display. The first and second developer systems can display two copies of the virtual object, each with its own modification encouraging simultaneous modification of the same virtual object.

In some embodiments, the editor hub receives the first and second command substantially simultaneously. The editor hub can create the two copies when the commands are received within a period of time or based on a condition, such as if the first modification to the virtual object has not yet been executed or if the first modification to the virtual object has not yet been delivered to the other game developer systems.

Figure 8:
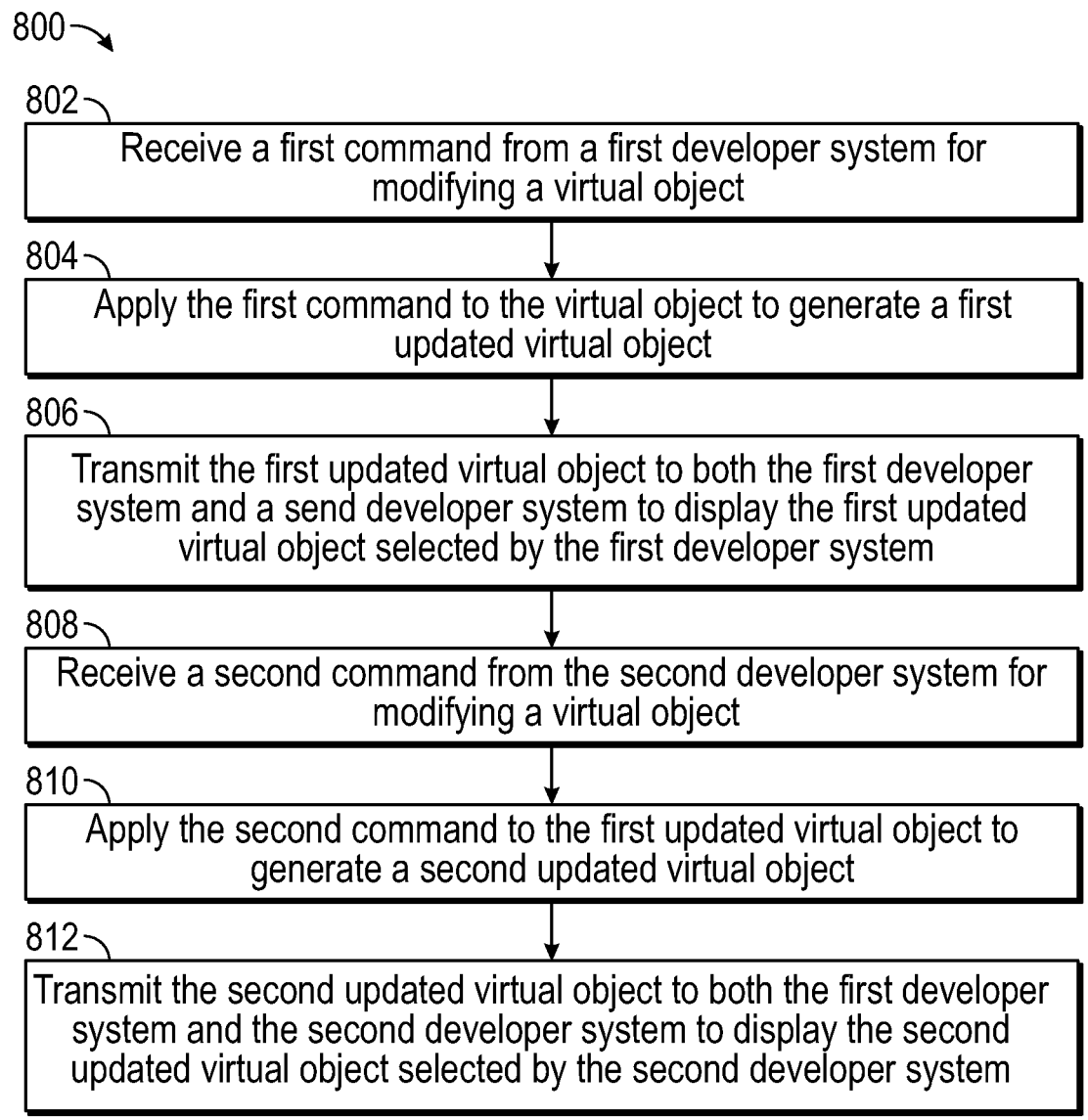
FIG. 8 illustrates a flowchart of an embodiment for command handling by multiple game developers of the same virtual object.

FIG. 8 illustrates a flowchart 800 of an embodiment for command handling by multiple game developers of the same virtual object. The process 800 can be implemented by any system that can handle simultaneous commands by multiple game developers of the same virtual object. For example, the process 800, in whole or in part, can be implemented by a game developer system 104, an editor hub 106, or other computing system. Although any number of systems, in whole or in part, can implement the process 800, to simplify discussion, the process 800 will be described with respect to particular systems. Further, although embodiments of the process 800 may be performed with respect to variations of systems comprising various game application environments, to simplify discussion, the process 800 will be described with respect to the editor hub 106.

At (802) of the process 800, the editor hub can receive a first command from a first developer system for modifying a virtual object. At (804), the editor hub can apply the first command to the virtual object to generate a first updated virtual object with the modifications requested by the first developer system.

At (806), the editor hub can transmit the first updated virtual object the first developer system and a second developer system to display the first updated virtual object selected by the first developer system. As such, both developer systems can see the updates made by the first developer system and can see that the first developer system has selected the virtual object.

At (808), the editor hub can receive a second command from the second developer system for modifying the virtual object. At (810), the editor hub can apply the second command to the first updated virtual object to generate a second updated virtual object.

At (812) the editor hub can transmit the second updated virtual object to both the first developer system and the second developer system to display the second updated virtual object selected by the second developer system. Both of the developer systems can display the additional modification made by the second developer system and the first developer system can know that the second developer system has the virtual object selected.

In some embodiments, the editor hub can receive a time stamp for the command, and determine the order of the modifications based on the time the command was transmitted or received.

In some embodiments, the editor hub can undo edits made by multiple game developers. The editor hub can undo edits made by one developer while maintaining the edits made by another developer. For example, a first developer can edit the color while the second developer can edit the size of a virtual object. The editor hub can undo the color edit while maintaining the size modification to the virtual object.

IX. Overview of Computing Device

FIG. 9 illustrates an embodiment of computing device 910 according to the present disclosure. Other variations of the computing device 910 may be substituted for the examples explicitly presented herein, such as removing or adding components to the computing device 910. The computing device 910 may include a game device, a smart phone, a tablet, a personal computer, a laptop, a smart television, a car console display, a server, and the like. The computing device 910 may also be distributed across multiple geographical locations. For example, the computing device 910 may be a cluster of cloud-based servers.

As shown, the computing device 910 includes a processing unit 920 that interacts with other components of the computing device 910 and also external components to computing device 910. A game media reader 922 is included that communicates with game media 912. The game media reader 922 may be an optical disc reader capable of reading optical discs, such as CD-ROMs or DVDs, or any other type of reader that can receive and read data from game media 912. One or more of the computing devices may be used to implement one or more of the systems disclosed herein.

Computing device 910 may include a separate graphics processor 924. In some cases, the graphics processor 924 may be built into the processing unit 920. In some such cases, the graphics processor 924 may share Random Access Memory (RAM) with the processing unit 920. Alternatively or additionally, the computing device 910 may include a discrete graphics processor 924 that is separate from the processing unit 920. In some such cases, the graphics processor 924 may have separate RAM from the processing unit 920. Computing device 910 might be a handheld game application device, a dedicated game console computing system, a general-purpose laptop or desktop computer, a smart phone, a tablet, a car console, or other suitable system.

Computing device 910 also includes various components for enabling input/output, such as an I/O 932, a user I/O 934, a display I/O 936, and a network I/O 938. I/O 932 interacts with storage element 940 and, through a device 942, removable storage media 944 in order to provide storage for computing device 910. Processing unit 920 can communicate through I/O 932 to store data, such as game state data and any shared data files. In addition to storage 940 and removable storage media 944, computing device 910 is also shown including ROM (Read-Only Memory) 946 and RAM 948. RAM 948 may be used for data that is accessed frequently, such as when a video game is being played.

User I/O 934 is used to send and receive commands between processing unit 920 and user devices, such as game controllers. In some embodiments, the user I/O 934 can include a touchscreen input. The touchscreen can be capacitive touchscreen, a resistive touchscreen, or other type of touchscreen technology that is configured to receive user input through tactile inputs from the player. Display I/O 936 provides input/output functions that are used to display images from the game being played. Network I/O 938 is used for input/output functions for a network. Network I/O 938 may be used during execution of a game, such as when a game is being played online or being accessed online, application of fraud detection, and/or generation of a fraud detection model.

Display output signals produced by display I/O 936 comprise signals for displaying visual content produced by computing device 910 on a display device, such as graphics, user interfaces, video, and/or other visual content. Computing device 910 may comprise one or more integrated displays configured to receive display output signals produced by display I/O 936. According to some embodiments, display output signals produced by display I/O 936 may also be output to one or more display devices external to computing device 910.

The computing device 910 can also include other features that may be used with a video game, such as a clock 950, flash memory 952, and other components. An audio/video player 956 might also be used to play a video sequence, such as a movie. It should be understood that other components may be provided in computing device 910 and that a person skilled in the art will appreciate other variations of computing device 910.

Program code can be stored in ROM 946, RAM 948 or storage 940 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 940, and/or on removable media such as game media 912 (which can be a CD-ROM, cartridge, memory chip or the like, or obtained over a network or other electronic channel as needed). In general, program code can be found embodied in a tangible non-transitory signal-bearing medium.

Random access memory (RAM) 948 (and possibly other storage) is usable to store variables and other game and processor data as needed. RAM 948 is used and holds data that is generated during the execution of an application and portions thereof might also be reserved for frame buffers, application state information, and/or other data needed or usable for interpreting user input and generating display outputs. Generally, RAM 948 is volatile storage and data stored within RAM 948 may be lost when the computing device 910 is turned off or loses power.

As computing device 910 reads game media 912 and provides an application, information may be read from game media 912 and stored in a memory device, such as RAM 948. Additionally, data from storage 940, ROM 946, servers accessed via a network (not shown), or removable storage media 944 may be read and loaded into RAM 948. Although data is described as being found in RAM 948, it will be understood that data does not have to be stored in RAM 948 and may be stored in other memory accessible to processing unit 920 or distributed among several media, such as game media 912 and storage 940.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for editing immutable game data of a game application within a virtual development space, wherein the method includes:
    connecting a first game developer system to a virtual development space, wherein the virtual development space enables a plurality of game developer systems to edit immutable game data associated with virtual objects of the game application, wherein the virtual development space includes a three-dimensional simulated space instanced on a computer server that is accessible by a plurality of game developers systems and that are located remotely from the computer server to edit immutable game data, wherein the immutable game data includes at least a virtual object;
    connecting a second game developer system to the virtual development space;
    receiving from the first game developer system a first selection of the virtual object in the virtual development space;
    receiving a first command from the first game developer system to edit the virtual object in the virtual development space;
    receiving a second command from the second game developer system to edit the virtual object in the virtual development space;
    initiating a change to the virtual object in the immutable game data corresponding to the first command to generate a first updated virtual object;
    initiating a change to the first updated virtual object in the immutable game data corresponding to the second command to generate a second updated virtual object; and
    transmitting the second updated virtual object to the first and second game developer systems.

2. The method of claim 1, further comprising:
    identifying a first and second time stamp of receiving the first and second command, respectively;
    determining that the first command was received before the second command based on the first and second time stamp; and
    initiating the change corresponding to the first command before initiating the change corresponding to the second command.

3. The method of claim 1, further comprising:
    initiating a change to the virtual object corresponding to both the first and second command at the same time to generate a third updated virtual object, wherein the first command is related to a first characteristic of the virtual object and the second command is related to a second characteristic of the virtual object different than the first characteristic.

4. The method of claim 3, further comprising:
    receiving, from an editor system, a command to undo the change that correspond to the first command; and initiating a change to the third updated virtual object to remove the changes that correspond to the first command while maintaining the changes that correspond to the second command.

5. The method of claim 1, further comprising:
transmitting the first updated virtual object to the second game developer system for display of the change initiated by the first game developer system of the virtual object.

6. The method of claim 1, wherein connecting the first game developer system includes generating a first avatar associated with the first game developer system, and transmitting a location of the first avatar to the first and second game developer systems to display the first avatar at the location.

7. The method of claim 6, further comprising:
receiving a request to move the first avatar from the location to a new location; and
transmitting the new location of the first avatar to the second game developer system to display the first avatar in the new location on the second game developer system.

8. The method of claim 1, wherein initiating the change to the virtual object in the immutable game data corresponding to the first command to generate an updated virtual object is in response to a director game developer system approving of the change.

9. The method of claim 1, further comprising:
generating a first representation of the second updated virtual object for display on the first game developer system; and
generating a second representation of the second updated virtual object for display on the second game developer system, wherein generating the first and second representations of the second updated virtual object is based on a characteristic of the first and second game developer systems, respectively.

10. The method of claim 9, wherein the characteristic includes at least one of: a processing power, a display capability, network throughput, memory capacity, or type of game developer system.

11. The method of claim 9, wherein generating the first and second representations include at least one of: merging vertices, compressing textures, compressing geometry, or adjusting a size of the virtual object.

12. The method of claim 9, further comprising:
generating a first representation of the second updated virtual object for display on the first game developer system; and
generating a second representation of the second updated virtual object for display on the second game developer system, wherein generating the first and second representations of the second updated virtual object is based on a characteristic of the first and second game developer systems, respectively.

13. A system for editing immutable game data of a game application within a virtual development space, wherein the system includes:
one or more processors configured with computer executable instructions that configure the one or more processors to:
connect a first game developer system to a virtual development space, wherein the virtual development space enables a plurality of game developer systems to edit immutable game data associated with virtual objects of the game application, wherein the virtual development space includes a three-dimensional simulated space instanced on a computer server that is accessible by a plurality of game developers systems and that are located remotely from the computer server to edit immutable game data, wherein the immutable game data includes at least a virtual object;
connect a second game developer system to the virtual development space;
receive from the first game developer system a first selection of the virtual object in the virtual development space;
receive a first command from the first game developer system to edit the virtual object in the virtual development space;
receive a second command from the second game developer system to edit the virtual object in the virtual development space;
initiate a change to the virtual object in the immutable game data corresponding to the first command to generate a first updated virtual object;
initiate a change to the first updated virtual object in the immutable game data corresponding to the second command to generate a second updated virtual object; and
transmit the second updated virtual object to the first and second game developer systems.

14. The system of claim 13, wherein the one or more processors are further configured to:
generate a playable instance of a game based on the immutable game data, wherein the immutable game data includes the second updated virtual object, wherein the immutable game data is not changable by players of the playable instance of the game.

15. The system of claim 13, wherein to connect the first game developer system includes generating a first avatar associated with the first game developer system, and transmitting a location of the first avatar to the first and second game developer systems to display the first avatar at the location.

16. The system of claim 15, the one or more processors are further configured to:
receive a request to move the first avatar from the location to a new location; and
transmit the new location of the first avatar to the second game developer system to display the first avatar in the new location on the second game developer system.

17. The system of claim 13, wherein to initiate the change to the virtual object in the immutable game data corresponding to the first command to generate an updated copy of the virtual object is in response to a director game developer system approving of the change.

18. The system of claim 13, wherein the one or more processors are further configured to:
generate a first representation of the second updated virtual object for display on the first game developer system; and
generate a second representation of the second updated virtual object for display on the first game developer system, wherein generating the first and second representations is based on a characteristic of the first and second game developer systems, respectively.

19. The system of claim 18, wherein the characteristic includes at least one of:
a processing power, a display capability, network throughput, memory capacity, or type of game developer system.

20. A non-transitory computer storage medium storing computer-executable instructions that, when executed by a processor, cause the processor to:

connect a first game developer system to a virtual development space, wherein the virtual development space enables a plurality of game developer systems to edit immutable game data associated with virtual objects of a game application, wherein the virtual development space includes a three-dimensional simulated space instanced on a computer server that is accessible by a plurality of game developers systems and that are located remotely from the computer server to edit immutable game data, wherein the immutable game data includes at least a virtual object;

connect a second game developer system to the virtual development space;

receive from the first game developer system a first selection of the virtual object in the virtual development space;

receive a first command from the first game developer system to edit the virtual object in the virtual development space;

receive a second command from the second game developer system to edit the virtual object in the virtual development space;

initiate a change to the virtual object in the immutable game data corresponding to the first command to generate a first updated virtual object;

initiate a change to the first updated virtual object in the immutable game data corresponding to the second command to generate a second updated virtual object; and transmit the second updated virtual object to the first and second game developer systems.

\* \* \* \* \*